Patented Dec. 9, 1924.

1,519,053

UNITED STATES PATENT OFFICE.

JOHN EDMOND REW, OF NIAGARA FALLS, NEW YORK.

MEDICATED COMBUSTIBLE.

No Drawing.  Application filed April 25, 1923.  Serial No. 634,607.

*To all whom it may concern:*

Be it known that I, JOHN E. REW, a citizen of the United States, residing at Niagara Falls, in the county of Niagara and State of New York, have invented certain new and useful Improvements in Medicated Combustibles, of which the following is a specification.

This invention relates to improvements in medicated combustibles.

The primary object of this invention is the provision of a composition of matter, partaking of the nature of a medicated combustible, and having a therapeutic value for the treatment of toothache, bronchitis, colds, asthma, palpitation of the heart, head ache, hay fever, and the like.

A further object of this invention is the provision of an improved medicated combustible, including novel ingredients, which may preferably be impregnated in a lamp wick, so that upon burning of the wick the vapor produced by the ingredients will have a therapeutic value.

Other objects and advantages of this invention will be apparent during the course of the following detailed description.

Referring to the novel composition of matter which in the preferred instance is impregnated in a wick of a vapor producing lamp, the same preferably comprises the following ingredients and their respective proportions: galangal 75%, charcoal 18%, nutmeg 7%.

The galangal is preferably the pungent aromatic rhizome of any of the various zinziberaceous plants, and is the ingredient of chief therapeutic value. The nutmeg, which is strongly aromatic, blends with the galangal during combustion to provide the vapors or fumes which have been found most effective in relieving and curing. The charcoal is, of course, an ingredient to support combustion.

The improved composition of matter may be used as a pastille, although it is preferred to impregnate the same into a combustible support, such as a cotton wick, either by boiling the wick therein, or impregnating the same therein in powdered form.

Various other ways to best obtain the desired combustion of the medicated combustible suggest themselves, but it is preferred to utilize the same in connection with a lamp wick.

As impregnated in a wick, the nutmeg ingredient of the improved composition neutralizes to a certain extent any disagreeable odors occurring from the combustion of the material of the wick.

From the foregoing description of this invention, it will be apparent that a composition of matter has been provided, which possesses therapeutic value, being adapted to diffuse a remedial smoke for local application or for inhalation.

Various changes in the ingredients and their proportions may be made to the improved composition of matter, without departing from the spirit of the invention or scope of the claims.

I claim:

1. A composition of matter consisting of galangal, charcoal, and nutmeg.

2. A composition of matter consisting of the following ingredients and their respective porportions; galangal 75%, charcoal 18%, nutmeg 7%.

3. As an article of manufacture, a wick impregnated with galangal, charcoal, and nutmeg.

4. As an article of manufacture, a wick impregnated with a mixture of the following ingredients and their respective proportions: galangal 75%, charcoal 18%, nutmeg 7%.

5. A composition of matter for the relief of toothache and other affections consisting of a mixture of galangal and nutmeg, and a combustible material mixed with the galangal and nutmeg, said composition of matter when ignited adapted to emit a smoke or vapor possessing a therapeutic value.

6. As an article of manufacture, a combustible supporting body impregnated with a mixture of the following ingredients and their respective proportions: galangal 75%, combustible material 18%, nutmeg 7%.

JOHN EDMOND REW.